US012196683B2

(12) United States Patent
Nakano et al.

(10) Patent No.: US 12,196,683 B2
(45) Date of Patent: Jan. 14, 2025

(54) METHOD FOR NOTIFYING SAMPLE ANALYZER STATUS AND SAMPLE ANALYSIS SYSTEM

(71) Applicant: SYSMEX CORPORATION, Kobe (JP)

(72) Inventors: Koki Nakano, Kobe (JP); Syunsuke Yao, Kobe (JP); Shouhei Kajino, Kobe (JP); Takahiro Saino, Kobe (JP); Tomohiro Kuroiwa, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 788 days.

(21) Appl. No.: 16/707,415

(22) Filed: Dec. 9, 2019

(65) Prior Publication Data

US 2020/0182797 A1    Jun. 11, 2020

(30) Foreign Application Priority Data

Dec. 10, 2018    (JP) .................................. 2018-231227

(51) Int. Cl.
*G01N 21/78*    (2006.01)
*G01N 35/00*    (2006.01)
*G01N 21/77*    (2006.01)

(52) U.S. Cl.
CPC ....... *G01N 21/78* (2013.01); *G01N 35/00584* (2013.01); *G01N 2021/7769* (2013.01); *G01N 2035/00306* (2013.01); *G01N 2035/00891* (2013.01); *G01N 2201/12* (2013.01)

(58) Field of Classification Search
CPC ............ G01N 21/78; G01N 35/00584; G01N 35/00722; G01N 2021/7769; G01N 2201/12; G01N 2035/00306; G01N 2035/00891
See application file for complete search history.

(56) References Cited

U.S. PATENT DOCUMENTS

| 4,374,623 A | * | 2/1983 | Simon | .................... | G04C 17/02 368/79 |
| 2013/0141246 A1 | * | 6/2013 | Thiel | ........................ | G08B 5/36 340/815.67 |
| 2013/0201019 A1 | * | 8/2013 | Yamaguchi | ...... | G01N 35/00871 340/540 |

(Continued)

FOREIGN PATENT DOCUMENTS

| CN | 101315389 A | 12/2008 |
| CN | 101667153 A | 3/2010 |

(Continued)

OTHER PUBLICATIONS

"UniCel DxH Series Workcell Coulter Cellular Analysis System Customer Training Modules", Beckman Coulter Technical Training, UniCel DxH Series Workcell, Ver 1.4, Jan. 2017, pp. 1-318.

(Continued)

*Primary Examiner* — Shogo Sasaki
(74) *Attorney, Agent, or Firm* — BUCHANAN, INGERSOLL & ROONEY PC (57) ABSTRACT

The present invention is to present a status notification method for the sample analyzer. The method includes a detection step for detecting the status of the sample analyzer for analyzing the sample, and an irradiating step for irradiating light upward in accordance with the detection step.

14 Claims, 10 Drawing Sheets

(56) References Cited

U.S. PATENT DOCUMENTS

2017/0191941 A1     7/2017   Hosotani et al.

FOREIGN PATENT DOCUMENTS

| | | |
|---|---|---|
| CN | 106304845 A | 1/2017 |
| CN | 106817818 A | 6/2017 |
| CN | 108737800 A | 11/2018 |
| JP | H5-70501 U | 9/1993 |
| JP | 2006170868 A | 6/2006 |
| JP | 2008-70115 A | 3/2008 |
| JP | 2011-15313 A | 1/2011 |
| JP | 2011-209219 A | 10/2011 |
| JP | 2012-73203 A | 4/2012 |
| JP | 2016061747 A | 4/2016 |
| WO | 2016/157516 A1 | 10/2016 |

OTHER PUBLICATIONS

Office Action (Notice of Reasons for Refusal) issued on May 10, 2022, by the Japanese Patent Office in corresponding Japanese Patent Application No. 2018-231227, and an English translation of the Office Action. (6 pages).

Office Action (The First Office Action) issued Oct. 20, 2023, by the National Intellectual Property Administration, P. R. China in corresponding Chinese Patent Application No. 201911261951.3 and an English translation of the Office Action. (19 pages).

Office Action (The Second Office Action) issued on Mar. 28, 2024, by the National Intellectual Property Administration, PRC in corresponding Chinese Patent Application No. 201911261951.3, and an English Translation of the Office Action. (25 pages).

\* cited by examiner

| No | Error message | Main LED | Notification device | | Light emission pattern |
|---|---|---|---|---|---|
| | | | Side surface | Upward | |
| 1 | High environmental temperature | Red light | Red light | Flashing red light | 3 |
| 2 | Insufficient blood quantity | Orange light | Green light | No light (selectable) | 2 |
| 3 | Analyzer communication error | Red light | Red light | Flashing red light | 3 |
| 4 | Cleaning required | Orange light | Green light | No light (selectable) | 2 |
| 5 | Sulfolyser depleted | Orange light | Green light | No light (selectable) | 2 |

FIG. 6

| Light emission pattern | Control signal | | Notification device | | Remarks |
|---|---|---|---|---|---|
| | First bit | Second bit | Upward | Side surface | |
| 1 | 0 | 0 | No light | No light | Power source turned OFF |
| 2 | 0 | 1 | No light (selectable) | Green light | Set to error requiring non-urgent attention |
| 3 | 1 | 0 | Flashing red light | Red light | Set to acute error requiring remedial action |
| 4 | 1 | 1 | Flashing red light | Orange light | Set to non-acute error requiring remedial action |

METHOD FOR NOTIFYING SAMPLE ANALYZER STATUS AND SAMPLE ANALYSIS SYSTEM

CROSS REFERENCE TO RELATED APPLICATION

This application claims priority from prior Japanese Patent Application No. 2018-231227, filed on Dec. 10, 2018, entitled "SAMPLE ANALYZER STATUS NOTIFICATION METHOD AND SAMPLE ANALYSIS SYSTEM", the entire contents of which are incorporated herein by reference.

FIELD OF THE INVENTION

The present invention relates to a status notification method and a sample analysis system for a sample analyzer that outputs light according to the status of the sample analyzer.

BACKGROUND

Conventional sample analyzers that analyze samples generate events of various kinds, such as errors when there is no reagent used for analysis or when a communication abnormality occurs, and warnings recommending cleaning of the device including the reagent inlet and the like. With respect to such a sample analyzer, there is a known technique for informing a nearby user by outputting light corresponding to an event that has occurred to urge the user to respond.

Japanese Patent Application Publication No. 2016-061747 discloses a technology in which a warning lamp installed at the upper part of a sample analyzer emits light based on the status of the sample analyzer. According to this technique, the user can comprehend the status of the sample analyzer by verifying the warning light, and can take necessary measures according to the comprehended content.

SUMMARY OF THE INVENTION

As described above, in the sample analyzer to which the technique described in Japanese Patent Application Publication No. 2016-061747 is applied, the user can comprehend the status of the sample analyzer by confirming the light output from the warning light installed in the upper part of the device. Then, the user can take necessary measures such as replenishment of reagents based on the status of the sample analyzer comprehended by the user.

However, the user is not always in a position where the light output from the warning light can be confirmed. For example, even if an error that needs to be dealt with urgently occurs in the sample analyzer and the warning light outputs light indicating the error, the user cannot grasp the error and perform the required response if the user is not in the vicinity of the sample analyzer.

Figure 10:
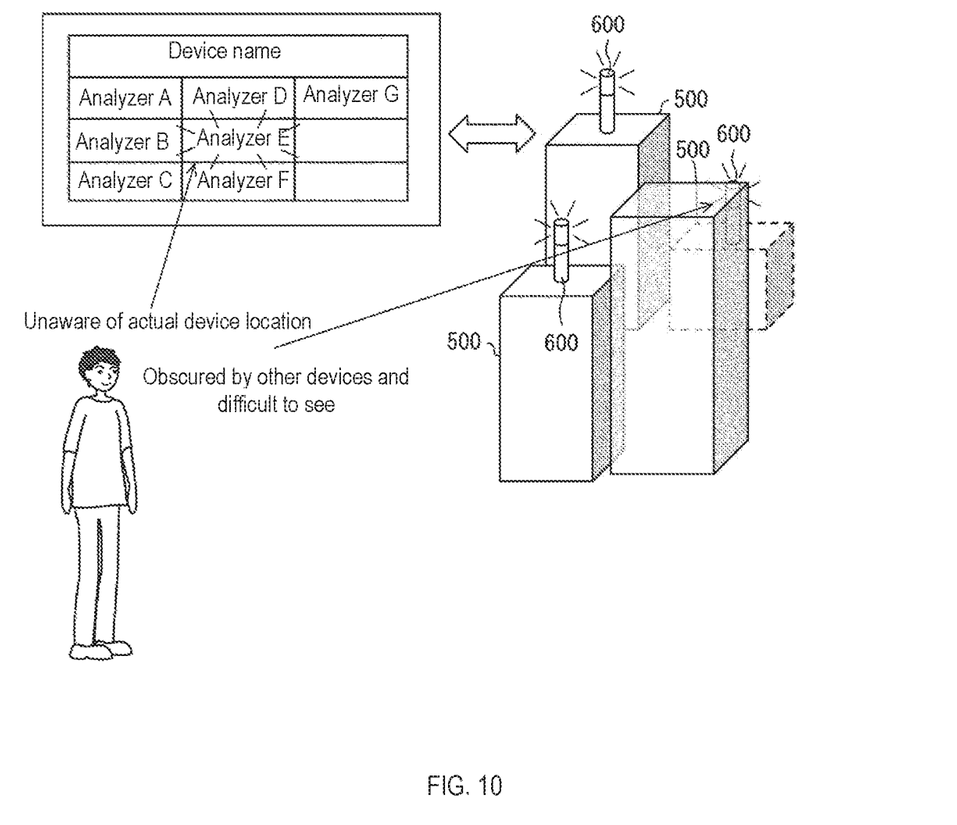
FIG. 10 is a schematic diagram showing a summary of problems in the prior art.

Hereinafter, a problem in the prior art will be described with reference to FIG. 10. FIG. 10 is a schematic diagram showing an outline of problems in the prior art.

In the example shown in the drawing, a plurality of sample analyzers 500 each having a warning light 600 installed thereon are installed in a predetermined space, similar to the sample analyzer described in Japanese Patent Application Publication No. 2016-061747. Here, each warning light 600 emits light according to the status of the individual sample analyzer 500 to which the waning light 600 is connected. The sizes of the individual sample analyzers 500 also are different, and devices other than the sample analyzer 500 are also installed in the same space. It also is assumed that the user is at a position away from each of the individual sample analyzers 500.

For example, assuming another device or the like larger than the sample analyzer 500, which is shown as a translucent rectangular parallelepiped in the illustrated example, is disposed between the user and the specific sample analyzer 500. At this time, the user cannot visually recognize the light of the warning light 600 installed in the specific sample analyzer 500 located on the opposite side of the user with this device or the like interposed therebetween. Since the user cannot comprehend the status of the specific sample analyzer 500 from the current position, the user needs to move to the vicinity of the specific sample analyzer 500.

There is also a known technique for displaying information, in the form of a list, on a display installed in a monitoring room or the like acquired as another means for the user to comprehend the status of the plurality of sample analyzers 500 without the user moving to the vicinity of the apparatus. When an error or the like is detected in a specific sample analyzer 500, the user can comprehend the status of the specific apparatus 500 without moving near the sample analyzer 500 by using a technique such as a blinking a character string indicating the specific sample analyzer 500 displayed on the display.

However, when an error such as a depleted reagent occurs in the sample analyzer 500, the user needs to move to the vicinity of the sample analyzer 500 and perform operations such as reagent replenishment in order to eliminate the error. In the related art that displays a list format on a display, the user cannot comprehend the actual position of the sample analyzer 500 in which an error has occurred. For example, after the user comprehends a sample analyzer 500 in which an error has occurred from the display, for example, the actual location of the sample analyzer 500 is not determined until the deployment position of the sample analyzer 500 is referred to via other information such as a layout sketch.

The present invention is to provide a technique capable of notifying a user of the status of the sample analyzer by light even from a position away from the sample analyzer so as to guide the user to the sample analyzer.

In order to solve the above-described problem, a status notification method according to an aspect of the present invention includes a detection step of detecting a status of a sample analyzer (100) for analyzing a sample, and an irradiating step of irradiating light upward according to the detection step.

According to this configuration, light can be irradiated upward according to the status of the sample analyzer (100) by the status notification method. In this way the user can comprehend the status of the sample analyzer (100) just by visually recognizing the light which illuminates the ceiling positioned above the user. The user also can be guided to the sample analyzer (100) by the user moving toward the light that illuminates the ceiling or the like. Therefore, it is possible to realize a status notification method capable of notifying of the status of the sample analyzer (100) by light, and guiding the user to the sample analyzer (100) even from a position a distance from the sample analyzer (100).

In the status notification method according to another aspect of the present invention, when an abnormal status of the sample analyzer (100) is detected in the detection step, light is irradiated upward in the irradiating step.

According to the above configuration, when the sample analyzer (100) is in an abnormal status, light can be irradiated upward by the status notification method. In this way the user can, for example, comprehend from the light that illuminates the ceiling that an abnormal status of the sample analyzer (100) has occurred.

In the status notification method according to another aspect of the present invention, the abnormal status is a status in which the sample analyzer (100) is not operating normally.

According to the above configuration, when the sample analyzer (100) is not operating normally light can be irradiated upward by the status notification method. In this way the user can be reliably notified that the sample analyzer (100) is not operating normally.

In the status notification method according to another aspect of the present invention, when it is detected that a reagent used for analyzing the sample has been depleted to a predetermined residual amount or less, light is irradiated upward in the irradiating step as an abnormal status of the sample analyzer (100).

According to the above configuration, the status notification method allows the sample analyzer (100) to irradiate light upward when the reagent used for analyzing the sample is near depleted. In this way the user is prompted to replenish the reagent, for example, before the reagent is exhausted completely.

The status notification method according to another aspect of the present invention further includes a switching step of switching between irradiation of light and non-irradiation of light, so as to switch to non-irradiation of light when the abnormal status of the sample analyzer (100) is not detected in the detection step.

According to the above configuration, the upward light is not irradiated when the abnormal status of the sample analyzer (100) is not detected by the status notification method. In this way, for example, the user can consider that the sample analyzer (100) arranged at a position where the ceiling is not irradiated with light is operating normally.

The status notification method according to another aspect of the present invention further includes a light emitting step of emitting light from the side, such that light is emitted from the side in the light emission step when switched to non-irradiation of light in the switching step.

According to this configuration, when an abnormal status of the sample analyzer (100) is not detected by the status notification method, the upward light is not irradiated and light can be emitted from the side. In this way, for example, the user can comprehend whether the sample analyzer (100) is operating normally simply by verifying the presence or absence of the upward light irradiation and the side light emission.

In the status notification method according to another aspect of the present invention, the color of light to be irradiated is changed in the irradiation step.

According to the above configuration, the color of the light irradiated upward can be changed according to the status of the sample analyzer (100) in the status notification method. In this way, for example, the sample analyzer (100) is set so that light of a different color is emitted according to the degree of importance, and the user can preferentially verify the sample analyzer (100) deployed near the position of irradiated light of a high importance color when confirming the ceiling.

In the status notification method according to another aspect of the present invention, the light emission color is changed in the light emission step.

According to the above configuration, the color of light emitted from the side can be changed in the status notification method. In this way, for example, the color of light emitted from the side changes according to the status of the sample analyzer (100), and the user located in the vicinity of the sample analyzer (100) can respond according to the side emission color.

In order to solve the above problems, a sample analysis system (1) according to still another aspect of the present invention provides a sample analyzer (100) for analyzing a sample, and a notification device (300) installed in the sample analyzer (100) incorporating an irradiating unit (330) for irradiating light upward, a control unit (320) that controls the irradiating unit (330) so as to switch the light irradiation status according to the status of the sample analyzer (100).

According to the above configuration, the sample analysis system (1) can control the irradiation status of the light irradiated upward by the irradiating unit (330) of the notification device (300) according to the status of the sample analyzer (100). Therefore, an analysis system (1) can be realized which can notify of the status of the sample analysis device (100) by the light from the notification device (300) even from a position away from the sample analysis device (100) to guide the user to the sample analysis device (100).

In the sample analysis system (1) according to another aspect of the present invention, the irradiating unit (330) includes an optical system (315) for irradiating light upward.

According to the above configuration, the notification device (300) can notify of the status of the sample analyzer (100) by the light irradiated upward by the optical system (315). In this way the notification can be performed more reliably since the light irradiated upward can be made brighter than the light output in another direction.

In the sample analysis system (1) according to another aspect of the present invention, the notification device (300) includes a housing (303) that houses the optical system (315), and the housing (303) has an irradiation window (301) provided on the top surface for irradiating light upward.

According to this configuration, the notification device (300) can irradiate light upward from the irradiation window (301) provided in the top surface of the housing.

In the sample analysis system (1) according to another aspect of the present invention, the housing (303) holds a color filter (310) that changes the color of light emitted from the irradiation window (301) in an exchangeable manner.

According to this configuration, the user can select an exchangeable color filter (310) to change the color of the light irradiated upward by the notification device (300). In this way, for example, color filters (310) of different colors can be selected according to the importance of the sample analyzer (100), and the user can preferentially confirm the sample analyzer (100) corresponding to the notification device (300 that irradiates light of a color of high degree of importance via the ceiling.

In the sample analysis system (1) according to another aspect of the present invention, the control unit (320) controls the irradiating unit (330) so as to switch between irradiation of light and non-irradiation of light.

According to this configuration, the notification device (300) can switch between irradiation of light and non-irradiation of light regarding the light irradiated upward. In this way, for example, the notification device (300) can irradiate light upward only for an error that requires urgent action to facilitate user confirmation via the light.

In the sample analysis system (1) according to another aspect of the present invention, the control unit (320) controls the irradiating unit (330) to irradiate light when the sample analyzer (100) is in an abnormal status.

According to this configuration, the notification device (300) can irradiate light upward when the sample analyzer (100) is in an abnormal status. In this way the user can be reliably notified of the abnormal status of the sample analyzer (100).

In the sample analysis system (1) according to another aspect of the present invention, the sample analyzer (100) includes a sensor (115) that detects the residual amount of the reagent used for the analysis of the sample; an abnormal status is when the sensor (115) detects that the residual amount is equal to or less than a predetermined remaining amount.

According to this configuration, the notification device (300) can irradiate light upward when the residual amount of the reagent detected by the sensor (115) in the sample analyzer (100) falls below a predetermined residual amount. In this way, for example, the user can move to the vicinity of the sample analyzer (300) in which the residual amount of the reagent is diminished based on the light that irradiates the ceiling, and can replenish the reagent.

In the sample analysis system (1) according to another aspect of the present invention, the notification device (300) includes a light emitting unit (340) provided on a side surface of the housing (303), and the control unit (320) controls the light irradiating unit (330) to switch the light emission status according to the status of the analyzer.

According to this configuration, the light emission unit (340) on a side surface can emit light according to the status of a sample analyzer (100). In this way, for example, the user can comprehend whether the sample analyzer (100) is operating normally simply by verifying the presence or absence of the upward light irradiation and the side light emission.

In the sample analysis system (1) according to another aspect of the present invention, when the sample analyzer (100) is in a normal status, the control unit (320) controls the irradiating unit (330) so as not to emit light, whereas the light emitting unit (340) is controlled to emit light.

According to this configuration, of the status notification method, when the sample analyzer (100) is in the normal status, the notification device (300) emits light from the side while not irradiating upward light.

In the sample analysis system (1) according to another aspect of the present invention, the normal status is a status in which the sample analyzer (100) is operating normally.

According to this configuration, the user can grasp whether the sample analyzer (100) is operating normally by simply confirming the upward light irradiation and the side light emission.

In the sample analysis system (1) according to another aspect of the present invention, the control unit (320) controls the light emitting unit (340) so as to change the light emission color.

According to this configuration, the notification device (300) can change the color of the light output from a side. In this way, for example, the light emission color from the side can be made different according to the status of the sample analyzer (100) or the like.

The sample analysis system (1) according to another aspect of the present invention further includes an information processing device (200) that generates a control signal according to the status of the sample analyzer (100), and the control unit (320) receives the control signal generated by the information processing device (200), and controls the irradiating unit (330) and the light emitting unit (340) based on the control signal.

According to this configuration, the notification device (300) can control then irradiating unit (330) and the light emitting unit (340) based on the control signal generated by the information processing apparatus (200).

In the sample analysis system (1) according to another aspect of the present invention, the notification device (300) can be installed separately from the sample analyzer (100).

According to this configuration, since the notification device (300) can be installed away from the sample analyzer (100), for example, it is possible to irradiate a position of the ceiling, which the user can easily recognize even if the sample analyzer (100) is at a position hidden by another device or the like.

DESCRIPTION OF THE EMBODIMENTS OF THE INVENTION

Sample Analysis System Summary

Figure 1:
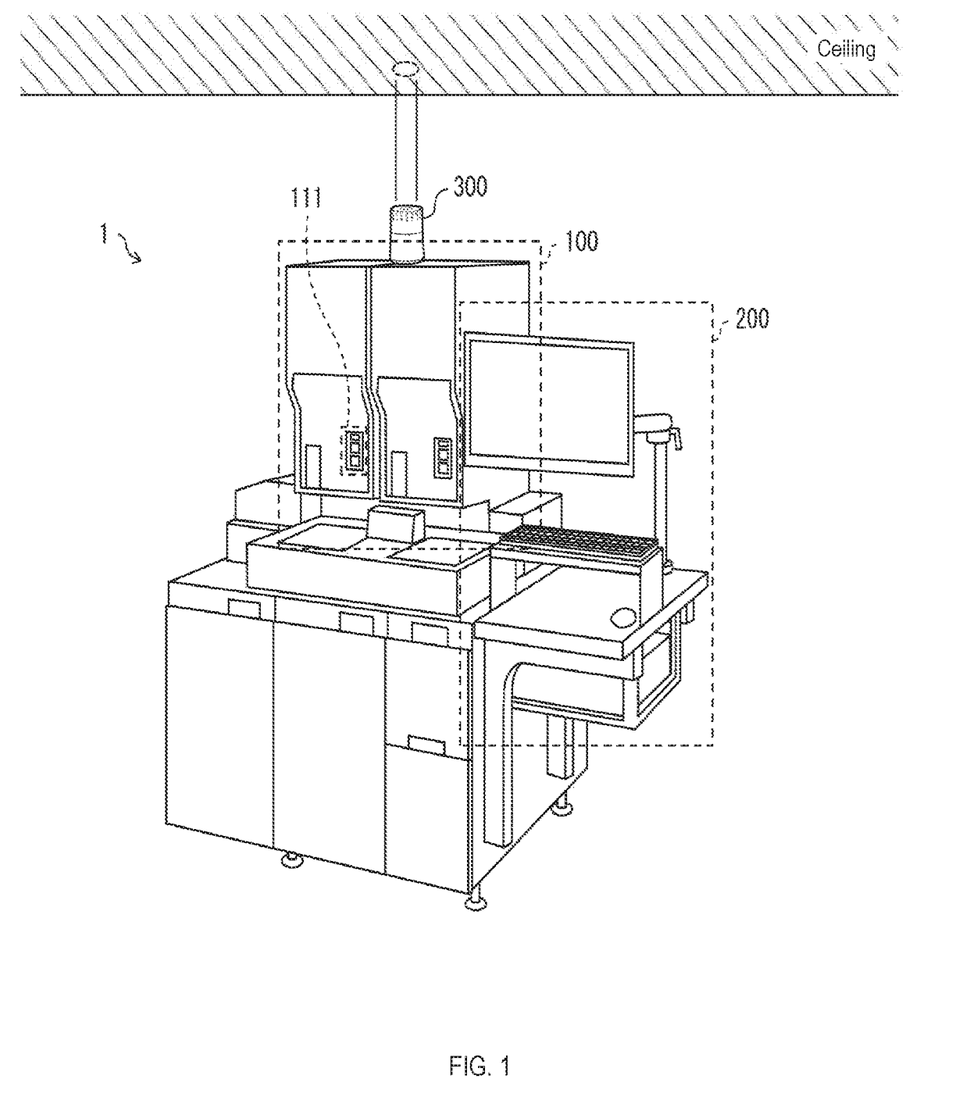
FIG. 1 is a perspective view showing an outline of a sample analysis system according to an embodiment of the present invention.

First, an overview of a sample analysis system 1 according to an embodiment of the present invention will be described with reference to FIG. 1. FIG. 1 is a perspective view showing an outline of a sample analysis system 1 according to an embodiment of the present invention.

As shown in FIG. 1, the sample analysis system 1 includes a sample analyzer 100, an information processing device 200, and a notification device 300. The sample analysis system 1 is a system in which a sample analyzer 100 installed on a wagon, a desk, or the like analyzes an analysis sample, and the analysis result is output by an information processing device 200. Note that the sample analyzer 100 can cause the indicator 111 disposed on the front surface to emit light in various light emission patterns according to the status of the apparatus, the analysis condition and the like. Although the sample analysis system 1 will be described using a sample analyzer 100 that analyzes various components of blood as a sample in the following description, the analyzer also may be a device that analyzes gases rather than blood as samples.

The sample analysis system 1 performs operations to irradiate light upward from the top of the apparatus 300 and to output light from the side according to control signals transmitted from the information processing apparatus 200 in accordance with the status of the sample analyzer 100. The status of the sample analyzer 100 includes an abnormal status in which the sample analyzer 100 is not operating normally and a normal status in which the sample analyzer 100 is operating normally. In the illustrated example, when the notification device 300 is installed on a wagon, that is, on top of the sample analyzer 100 and the sample analysis system 1 is installed in a room having a ceiling, the notification device 300 performs information notification by illuminating a certain area of the ceiling with light irradiated upward from the top of sample analyzer 100.

Sample Analysis System Structure

Figure 2:
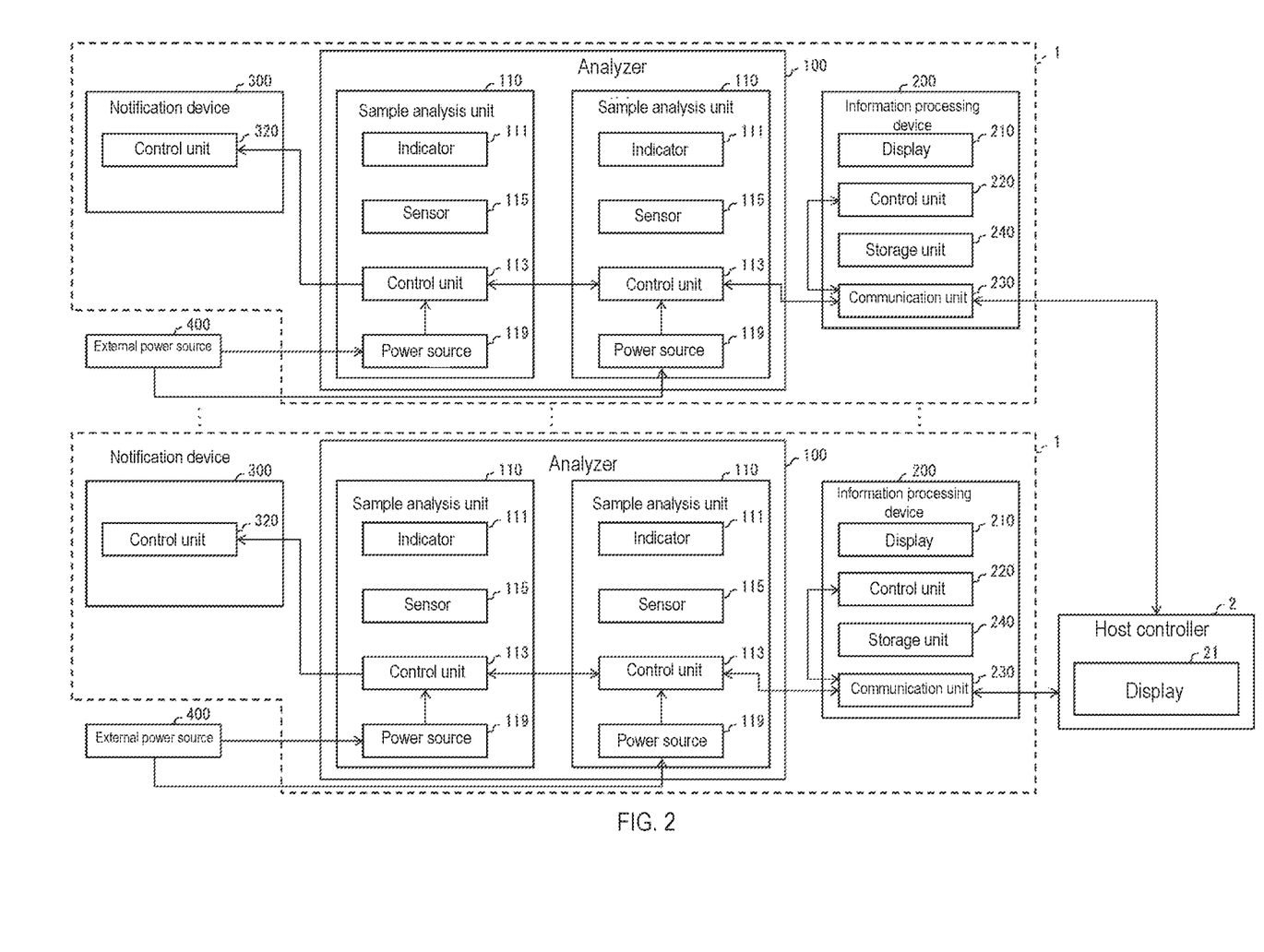
FIG. 2 is a diagram showing a configuration of a sample analysis system.

Next, the structure of the sample analysis system 1 according to an embodiment of the present invention will be described with reference to FIG. 2. FIG. 2 is a diagram showing a configuration of the sample analysis system 1 according to the present embodiment. In the illustrated example, the solid arrows indicates the flow of information, and a dashed arrow indicates the flow of power. Note that, as shown in FIG. 2, a plurality of sample analysis systems 1 are provided, and each sample analysis system 1 is controlled by a host controller 2 that controls the plurality of sample analysis systems 1 in an integrated manner. The host controller 2 includes a display 21 and outputs to the display 21 the operation status and the like of each sample analysis system 1.

The sample analysis system 1 includes a sample analyzer 100, an information processing device 200, and a notification device 300. The sample analyzer 100 includes two sample analysis units 110, and a control unit 113, an indicator 111, a sensor 115, and a power supply unit 119 are provided for each sample analysis unit 110. The information processing device 200 includes a display 210, a control unit 220, a storage unit 230, and a communication unit 240. The notification device 300 is provided with a control unit 320. Although the sample analyzer 100 and the notification device 300 are illustrated as separate devices in the present embodiment, the sample analyzer 100 also may be configured, for example, to include the notification device 300, and the notification device 300 also may communicate directly with the processing apparatus 200.

The sample analyzer 100 includes two sample analysis units 110 that operate with electric power supplied from an external power source 400. The sample analyzer 100 transmits to the information processing device 200 notification information for notification of the analysis results of the samples by the two sample analysis units 110 and the status of each part including the individual sample analysis units 110 detected by the sample analyzer 100. Note that although the sample analyzer 100 is configured to include two sample analysis units 110 in FIG. 2, the sample analyzer 100 also may be configured to include one or three or more sample analysis units 110, and the two sample analysis units 110 also may be mutually different units. Communication between the sample analyzer 100 and the information processing device 200 is performed by, for example, wired communication using a LAN (Local Area Network) cable, and also may be performed by wireless communication using a wireless LAN.

The sample analyzer 100 transmits the control signals received from the information processing device 200 to the notification device 300. Here, the control signal is a signal for controlling the operation of irradiating light upward from the notification device 300, and the control signal is generated by the information processing device 200 based on notification information transmitted from the sample analyzer 100 to the information processing device 200.

The sample analysis unit 110 performs analysis on the sample. For example, the sample analysis unit 110 classifies and counts various components in blood based on fluorescence and scattered light obtained when a predetermined laser is irradiated on the blood sample. The analysis result by the sample analysis unit 110 may be transmitted to another sample analysis unit 110 or may be transmitted to the information processing device 200. For example, the analysis result of the first sample analysis unit 110 may be taken over by the second sample analysis unit 110 to perform further analysis.

Each sample analysis unit 110 includes a control unit 113, an indicator 111, a sensor 115, and a power supply unit 119. The control unit 113 is a logic circuit such as a CPU (Central Processing Unit) formed by an integrated circuit (IC chip) or the like. The control unit 113 can operate the indicator 111 and the sensor 115 based on information acquired from the sample analyzer 100, another sample analysis unit 110, or the like. The indicator 111 emits light in a color or pattern according to the operating status of the sample analyzer 100 including the individual sample analysis units 110 and the two sample analysis units 110. The indicator 111 is, for example, an LED (Light Emitting Diode) light that outputs a combination of light of a plurality of colors. The sensor 115 is a sensor that detects the status of the sample analysis unit 110, that is, the status of the sample analysis unit including the sample analysis unit 110. For example, a temperature sensor that detects an environmental temperature or a weight sensor that detects the residual amount of a reagent used for analysis of the sample by weight. The power supply unit 119 is a power supply circuit including a connector that can be connected to an external power supply 400 and supplies power acquired from the external power supply 400 to the control unit 113.

The information processing device 200 can receive and process various types of information from the sample analyzer 100. The information processing device 200 is, for example, a computer. The display 210 can output information received by the information processing device 200 from the sample analyzer 100, and the processing result of the control unit 220 related to the information by sound or image. The display 210 is, for example, a liquid crystal display.

The control unit 220 is a logic circuit such as a CPU formed by an integrated circuit (IC chip) or the like, which controls each unit of the information processing device 200 in an integrated manner. The control unit 220 performs processing of the information received by the information processing device 200 from the sample analyzer 100 using the communication unit 240 by executing a program stored in the storage unit 230. Then, the control unit 220 causes the display 210 to output information and processing results received by the information processing device 200.

When the information received by the information processing device 200 from the sample analyzer 100 using the communication unit 240 is notification information indicating the occurrence of an error in the sample analyzer 100, the control unit 220 refers to the information stored in the storage unit 230 and determines an emission light pattern for the notification device 300 corresponding to the content of the notification information. Then, a control signal for causing the notification device 300 to emit light is generated in accordance with the determined light emission pattern, and this control signal is transmitted from the communication unit 240 to the notification device 300 via the sample analyzer 100.

The storage unit 230 stores various information handled by the information processing device 200. The storage unit 230 is, for example, a computer-readable recording medium that stores a program that can be executed by the control unit 220. The storage unit 230 also may store information referred to by the control unit 220, for example, a table of combinations of the content of the notification information transmitted from the sample analyzer 100 to the information processing device 200 and the light emission pattern of the notification device 300.

The notification device 300 performs an operation of irradiating light upward from the top of the sample analyzer 100 and an operation of emitting light from the side thereof according to the control signal received from the information processing device 200 via the sample analyzer 100. That is, the control unit 320 of the notification device 300 can control the irradiation of the upward light and light emission from a side according to a control signal. The control unit 320 is, for example, a PIC (Peripheral Interface Controller) in which a program necessary for control is written. As shown in FIG. 2, the notification device 300 is configured to operate by receiving power supplied from the sample analyzer 100, for example, to receive power and the control signal via a single cable such as a USB (universal serial bus) connected to the sample analysis unit 110. The notification device 300 notifies of the status of the sample analyzer 100 by means of light or the like irradiated above the sample analyzer 100.

In the notification device 300, a light source for irradiating light upward and a light source for emitting light from the side have different configurations. Each light source is, for example, an LED light, and outputs light of a different color for each light source so that light irradiated upward and light emitted from the side have different colors. Each light source also may output light in the same color as the indicator 111 included in the sample analysis unit 110, or may output light of different colors. The notification device 300 has a built-in lens that collects light so that the light irradiated upward illuminates a certain area of the ceiling. Note that the disposition of the notification device 300 is not limited insofar as the device is positioned so that the light irradiated upwards illuminates a ceiling. For example, the notification device 300 can be installed separately from the sample analyzer 100 within the reach of the cable.

Notification Device External Appearance

Figure 3:
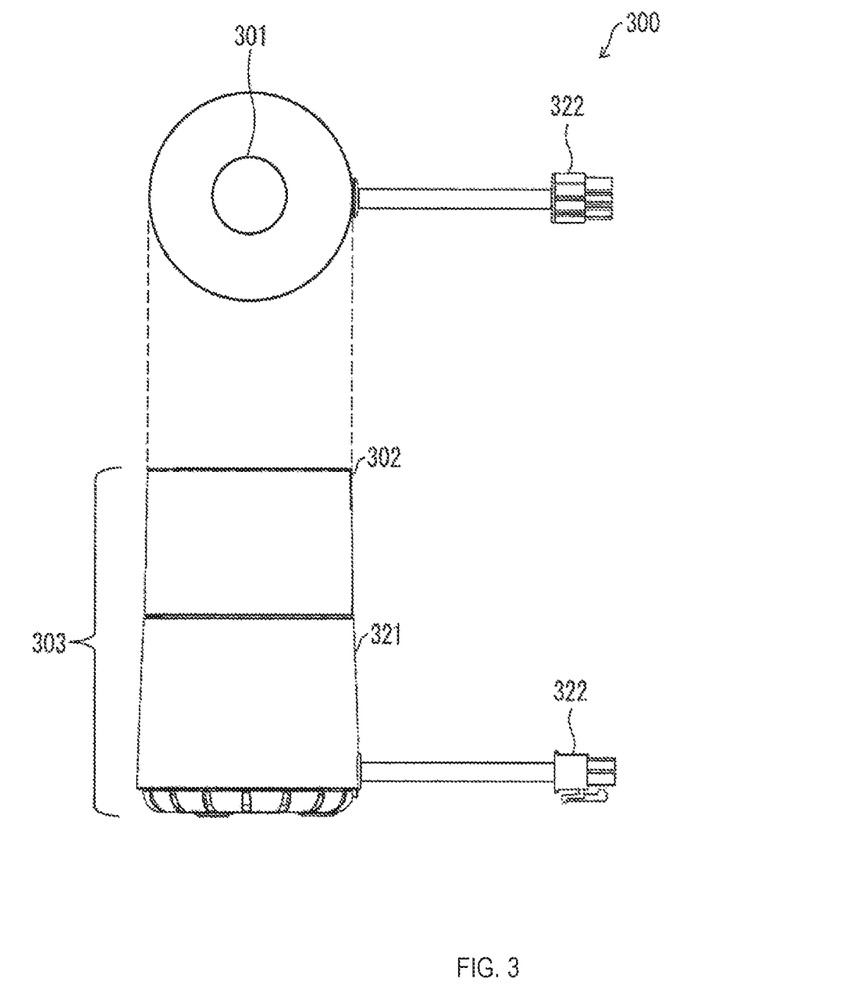
FIG. 3 is a projection view showing the external appearance of a notification device in the sample analysis system.

The external appearance of the notification device 300 which concerns an embodiment of the invention is described using FIG. 3. FIG. 3 is a projection view showing the external appearance of a notification device in the sample analysis system 1.

In the example shown in the figure, the notification device 300 has a columnar appearance accommodated in a housing 303, and has a configuration in which one cable 322 extends from the lower portion of the housing. The notification device 300 includes an irradiation window 301 for irradiating light from a light source upward at a central part of the upper surface of the housing 303.

The housing of the notification device 300 has separate upper and lower halves and a bottom surface, and the first exterior 302 configuring the upper half of the housing is made of a translucent material. Therefore, the notification device 300 can illuminate the inside surface of the first exterior 302 by scattering the light output from the light source.

The second exterior 321 configures the lower half of the housing of the notification device 300. The second exterior 321 is formed to accommodate the control unit 320 and the cable 322 can penetrate the side surface. The second exterior 321 also has a configuration such as a hook structure for attaching to the first exterior 302.

The cable 322 is a cable provided with a connector having one end connected to the control unit 320 of the notification device 300 and the other end connected to the sample analyzer 100. The cable 322 can supply the control unit 320 with power and the control signal received from the sample analyzer 100 connected by the connector.

Notification Device Internal Structure

Figure 4A:
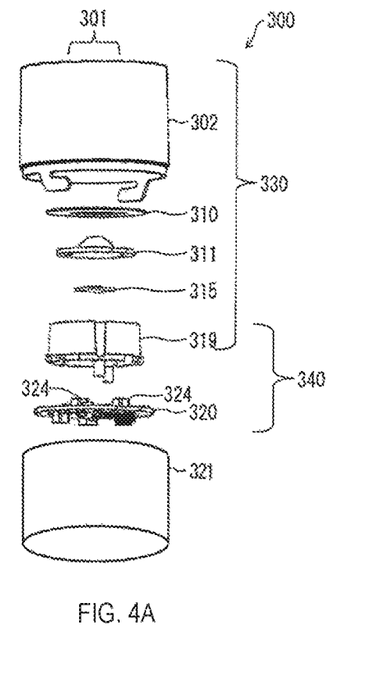
FIGS. 4A and 4B are an exploded view showing a hardware configuration of a notification device, and a top view of a control unit.
Figure 4B:
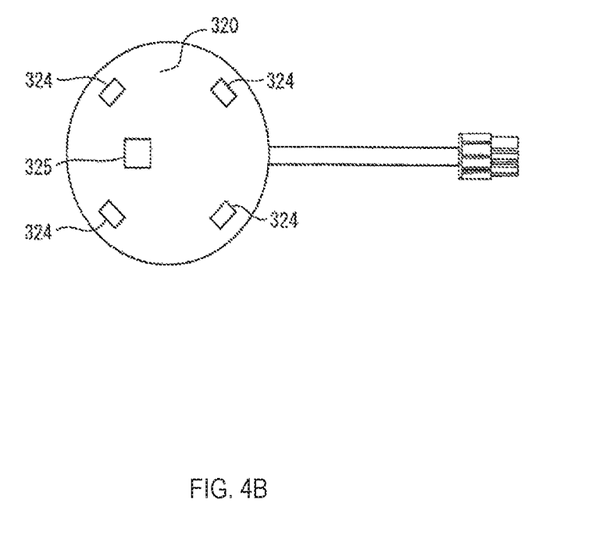

The internal structure of the notification device 300 according to the embodiment of the present invention will be described using FIG. 4. FIG. 4 is an exploded view showing the hardware configuration of the notification device 300 and a top view of the control unit 320.

FIG. 4A shows an exploded view of the notification device 300. In the drawing, only the structure relating to the upward light irradiation and the light emission from the side are illustrated; other structures also may be provided, and some structures may be replaced by another member. The notification device 300 includes a first exterior 302, a color filter 310, a top surface lens 311, a top surface LED 315, a reflector 319, and a control unit 320 in order from the top surface side to the bottom surface side. The irradiating unit 330 includes a first exterior 302, a color filter 310, a top lens 311, a top LED 315, and a reflector 319. The irradiating unit 330 is a configuration for irradiating light above the housing of the notification device 300. Since the irradiation window 301 described above is formed in the first exterior 302, the irradiation window 301 is also included in the irradiating unit 330. Similarly, the light emitting unit 340 includes a reflector 319 and a control unit 320. The light emitting unit 340 is provided on the side surface of the housing of the notification device 300 and is configured to output light from the side. The reflector 319 guides the light from the top LED 315 upward in the irradiating unit 330 and reflects the light from the side LED 324 to the side in the light emitting unit 340.

The color filter 310 is a color filter that is disposed so as to cover the irradiation window 301 of the first exterior 302 from the inside, and limits the color of light emitted from the irradiation window 301 and output from the top LED 315. There is no restriction of the color of the color filter 310, for example, the user can exchange the color filter 310 with various colors, such as red, pink, blue, green, yellow, and transparency, as needed. The color filter 310 is exchangeably held in the irradiation window 301, and the user can arbitrarily change the color of the light irradiated upward.

The top lens 311 is a convex lens that condenses the light output from the top LED 315. The top lens 311 condenses light output upward from the irradiation window 301 so as to become parallel light.

The top surface LED 315 emits light by the power received from the control unit 320 and functions as an optical system for irradiating light above the notification device 300. If the light source can irradiate light upward above the notification device 300, top surface LED 315, for example, an LED light, may be another light source such as a laser and other light sources, such as a laser. Note that the top surface light source 311 may be omitted when the top LED is a laser light source.

The control unit 320 operates with the external power received through the cable 322, and can operate each unit according to the control signal received from the outside through the cable 322. In FIG. 4, the control unit 320 includes both an internal substrate and a PIC disposed on the internal substrate. The control unit 320 controls the light irradiation status of the irradiating unit 330 according to the control signal transmitted from the information processing device 200 and related to the status of the sample analyzer 100.

The control unit 320 also can switch between irradiation and non-irradiation of light in the irradiating unit 330 by controlling the presence or absence of power supplied to the top LED 315. For example, when the sample analyzer 100 is in an abnormal status, the control unit 320 receives a control signal transmitted from the information processing device 200 via the control unit 113 of the sample analyzer 100, and supplies power to the top LED 315 to irradiate light from the irradiating unit 330. On the other hand, when the sample analyzer 100 is in a normal status, that is, when the sensor 115 of the sample analyzer unit 110 does not detect the abnormal status of the sample analyzer 100, the control signal transmitted from the information processing apparatus 200 is received, and the top surface LED 315 is controlled not to emit light by not supplying power to the top LED 315.

FIG. 4B shows a top view of the control unit 320. The controller 320 includes four side LEDs 324 along the peripheral edge of the upper surface, and a dip switch 325 on the inner side.

On the internal substrate of the controller 320, four side LEDs 324 are provided along the peripheral edge on the upper surface side, and a dip switch 325 is provided on the inner side. Then, the control unit 320 receives the control signal transmitted from the information processing apparatus 200 via the control unit 113 of the sample analyzer 100 according to the status of the sample analyzer 100, and causes the side LED 324 to emit light.

The side LED 324 is a light source that generates and outputs light for the notification device 300 to output light from the side of the first exterior 302. The side LED 324 is a light source that can change the color of light output in accordance with the control by the control unit 320 based on the control signal, and is a combination of light sources of a plurality of colors. The dip switch 325 is a change-over switch that can switch the color of light that the side LED 324 outputs in accordance with a specific control signal. That is, the notification device 300 changes the color of light output from the side surface of the first exterior 302 by switching the dip switch 325.

Notification Device Operation Example

Figure 5:
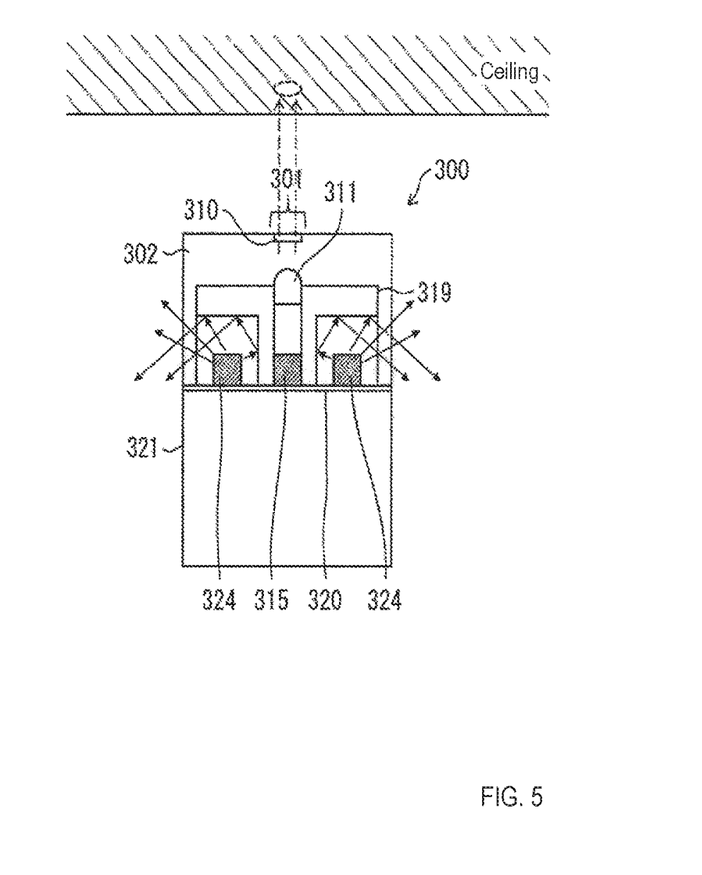
FIG. 5 is a cross-section view of an irradiating unit and a light emitting unit of the notification device.

An operation in which the notification device 300 irradiates light upward and emits light from the side will be described with reference to FIG. 5. FIG. 5 is a cross-sectional view of the irradiating unit 330 and the light emitting unit 340 of the notification device 300.

In the example of the drawing, the top LED 315 is disposed inside a cylindrical reflector 319, and the side LED 324 is disposed outside the reflector 319. The light output from the top LED 315 is incident on the top lens 311 directly or after being reflected by the inner surface of the reflector 319. The light incident on the top lens 311 is irradiated upward from the interface, and the emission color is limited by the color filter 310 and then emitted from the irradiation window 301. At this time, due to the action of the top surface lens 311, the light irradiated upward has suppressed diffusion and becomes a substantially parallel light beam.

On the other hand, the light output from the side LED 324 is incident on the inside surface of the first exterior 302 directly or after being scattered on the outer surface of the reflector 319. At this time, the light directed upward from the light output from the side LED 324 is reflected by the reflector 319, and thus does not enter the top lens 311. The light output from the side LED 324 can illuminate the entire inner side surface of the first exterior 302 by the action of the reflector. The control unit 320 may control the top LED 315 so as to not irradiate light, and may emit light from the side of the notification device 300 by supplying power to the side LED 324.

Error and Light Emission Pattern Combination Examples

Figure 6:
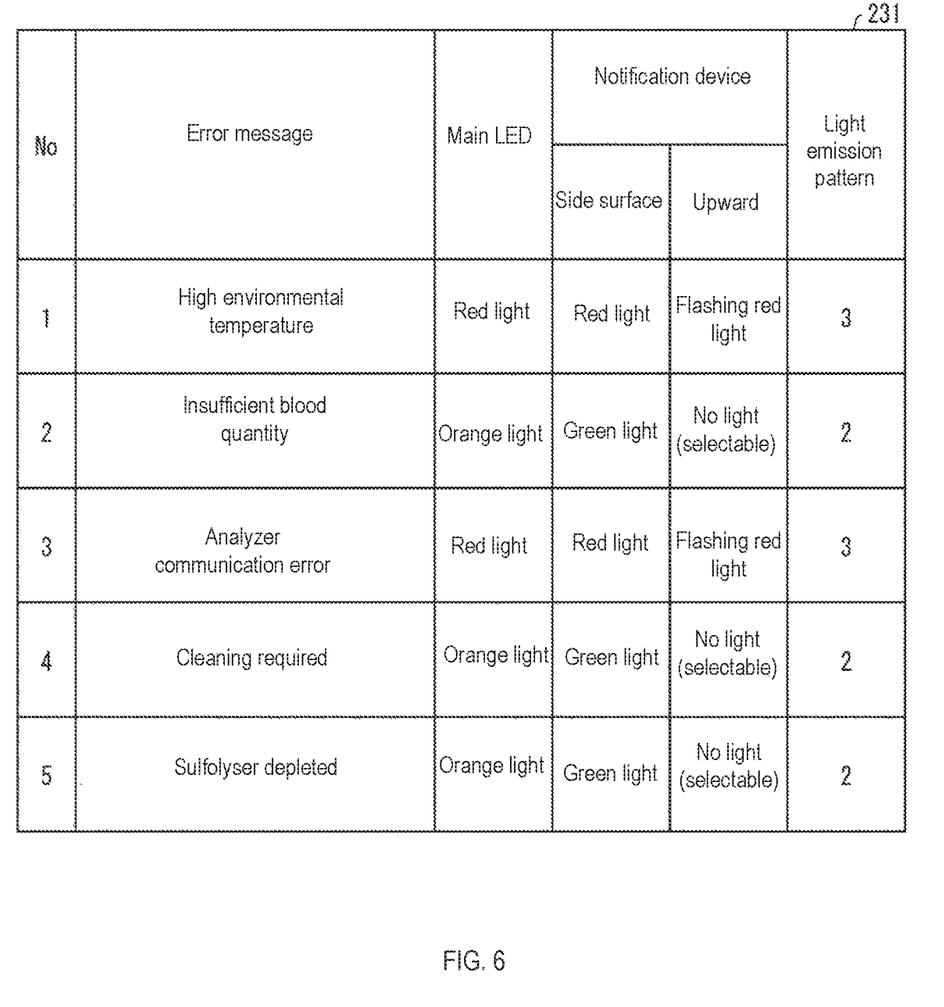
FIG. 6 is a partial error list showing a list of errors that can be detected by the sample analyzer in the sample analysis system.

A specific example of a combination of an error that may occur in the sample analyzer 100 and a light emission pattern that causes the notification device 300 to emit light according to the error will be described with reference to FIG. 6 FIG. 6 is a partial error list 231 that shows a list of errors that can be detected by the sample analyzer 100 in the sample analysis system 1. That is, the sample analyzer 100 can detect various errors including the illustrated example.

In the example of the drawing, "No" is an identifier (ID) that uniquely identifies an error message. The "error message" is a message for notifying of the content of the error detected by the sample analyzer 100 and is, for example, output from the display 210 of the information processing apparatus 200 by video or audio. "Main body LED" indicates the status of the indicator 111 provided in the sample analysis unit 110 of the sample analyzer 100. The "side surface" of the "notification device" indicates the color of light output from the side surface of the notification device 300, and "upward" indicates the color of light emitted from the irradiation window 301 provided on the upper surface of the notification device 300. "Light emission pattern" is a combination of the values of "side surface" and "upward" of the "notification device" as the light emission pattern of notification device 300.

For example, a record of "No" is "1" indicates that the "error message" is "high environmental temperature". This error is set, for example, when the sensor 115 of the sample analysis unit 110 detects that the ambient temperature around the sample analyzer 100 is so high as to greatly affect the analysis. At this time, the "side LED" and the "side surface" of the "notification device" are both "lighted red", and the "upper side" of the "notification device" is "flashing red". That is, the indicator 111 provided in the sample analysis unit 110 of the sample analyzer 100 is lighted red, and red light is output from the side surface of the notification device 300. Also red light is output intermittently from the upper part of the notification device 300.

A record in which "No" is "5" indicates that the "error message" is "the sulfolyser is depleted". This error is set when, for example, the sensor 115 detects that the "sulfolyser", which is a reagent used for the analysis, has become less than a predetermined residual amount when the sample analyzer 100 performs an analysis of blood as a sample. At this time, the "main body LED" is "lighted orange", the "side surface" of the "notification device" is "lighted green", and the "upper" is "off (selectable)". Here, "lamp off (selectable)" indicates that light irradiation and non-irradiation in the irradiation unit 330 can be selectively changed. That is, the indicator 111 provided in the sample analysis unit 110 of the sample analyzer 100 lights in orange, and green light is output from the side surface of the notification device 300.

Irradiation of light from the upper part of the notification device 300 is controlled based on user selection. That is, the presence or absence of light emission and the emission color can be controlled by the control unit 320 based on user selection.

In this way the light emission pattern of the notification device 300 is set in advance by the user in accordance with the error detected in the sample analyzer 100. The error list 231 is stored in, for example, the storage unit 230 of the information processing apparatus 200, and by operating the information processing apparatus 200, the value of the record that is "lamp off (selectable)" "upward" of the "notification device" can be changed.

Specific Examples of Control Signals

Figure 7:
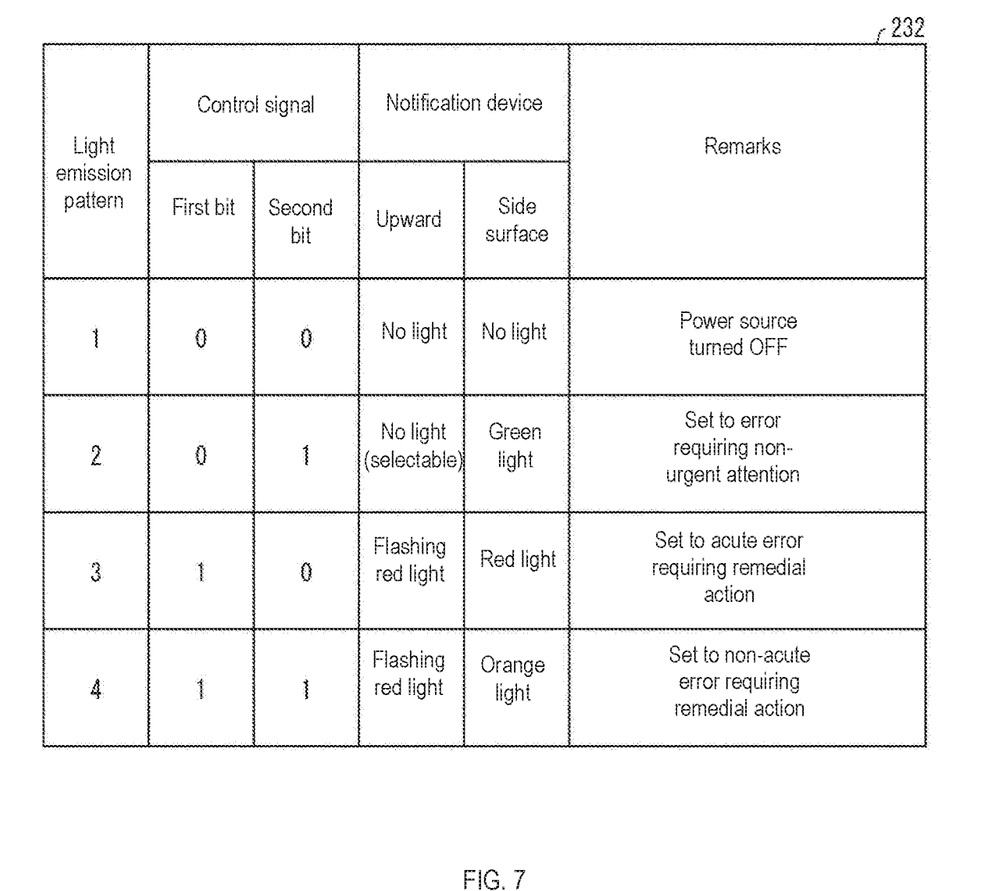
FIG. 7 is an example of a table showing the correspondence between light emission patterns and control signals referred to by the information processing apparatus in the sample analysis system.

Control signals for controlling the light emission pattern of notification device 300 transmitted from information processing device 200 to notification device 300 will be described with reference to FIG. 7. FIG. 7 is an example of control information 232 associating a control signal indicating the control content for the notification device 300 and each status that can be generated in the sample analyzer 100 and is referred to by the information processing apparatus 200 in the sample analysis system 1.

In the example of the drawing, the "light emission pattern" is an identifier that identifies a combination of light emission operations of the top LED 315 and the side LED 324 of the notification device 300. The "control signal" indicates a specific value of the control signal transmitted from the information processing apparatus 200; "first bit" is the binary value of the first bit of the control signal, and "second bit" is the binary value of the second bit of the control signal. That is, in the example of the drawing, the control signal is shown as a 2-bit signal. "Upward" of "notification device" indicates the operation status of the top LED 315, and "side surface" indicates the operation status of the side LED 324 of the notification device 300. "Remarks" indicates when the control signal specified by the "light emission pattern" is transmitted to the notification device 300 in the sample analyzer 100. Note that the "light emission pattern" corresponds to the item of the same name in FIG. 6.

For example, when the "light emission pattern" is "1", the information processing apparatus 200 sends a control signal having a value of "00" to which the first bit and the second bit are both "0". When the notification device 300 receives "00" as the control signal, both the top LED 315 and the side LED 324 are turned off.

When the "light emission pattern" is "2", the information processing apparatus 200 transmits a control signal having a value of "01". Upon receiving "01" as the control signal, the notification device 300 controls the light output of the top LED 315 based on the content selected in advance, and causes the side LED 324 to output green light.

In this way the notification device 300 in the sample analysis system 1 can control light emission based on the control signal transmitted from the information processing device 200.

Process Flow

Figure 8:
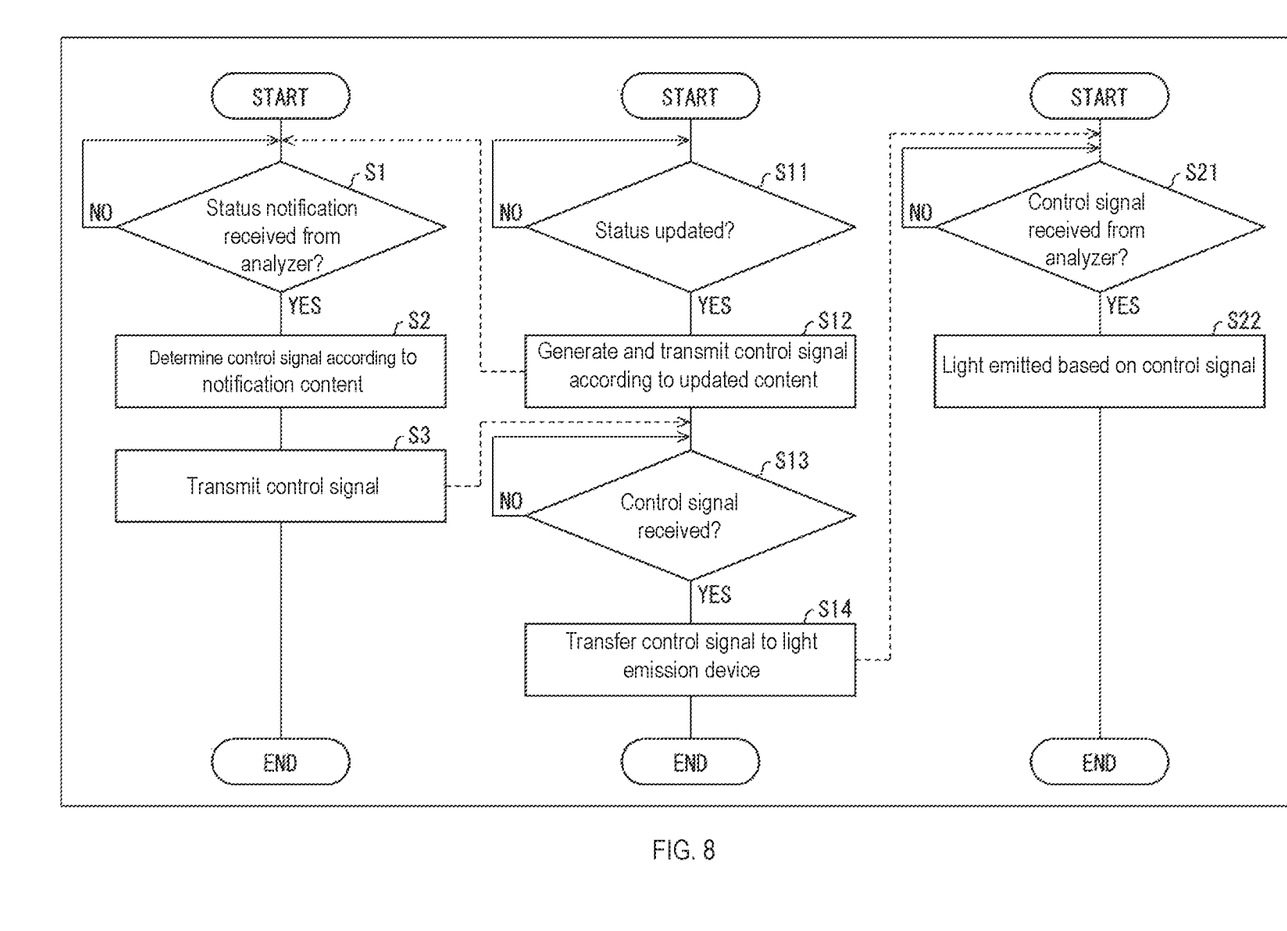
FIG. 8 is a flowchart showing an example of processing executed by the information processing apparatus, the sample analysis apparatus, and the notification apparatus in the sample analysis system.

The flow of operation in the sample analysis system 1 according to the embodiment of the present invention will be described with reference to FIG. 8. FIG. 8 is a flow chart showing processing examples executed by the information processing device 200, the sample analysis device 100, and the notification device 300 in the sample analysis system 1.

First, in the sample analyzer 100, when the status (status) of the sample analyzer 100 is updated due to an error detected during operation or the like (YES in S11), the sample analyzer 100 displays the error list 231, generates a notification signal designating the light emission pattern corresponding to the updated content, and transmits the notification signal to the information processing apparatus 200 (S12).

Next, when the information processing apparatus 200 receives the notification signal transmitted from the sample analyzer 100 by the process of S12 (YES in S1), the information processing apparatus 200 determines a control signal corresponding to the notification content using the control information 232 or the like (S2). Thereafter, the information processing device 200 transmits a control signal for controlling the notification device 300 to the sample analyzer 100 (S3). The operation of the information processing apparatus 200 then ends.

When the sample analyzer 100 receives the control signal transmitted from the information processing device 200 by the process of S3 (YES in S13), the sample analyzer 100 transfers the received control signal to the notification device 300 (S14). The operation of the sample analyzer 100 then ends.

When the notification device 300 receives the control signal transferred from the sample analyzer 100 in the process of S14 (YES in S21), the notification device 300 performs a light emission operation using the top LED 315 and the side LED 324 based on the received control signal (S22).). The operation of the notification device 300 then ends.

In this way the light emitting operation of the notification device 300 can be controlled according to the status of the sample analyzer 100 in the sample analysis system 1 according to the embodiment of the present invention.

Advantages of Sample Analysis System

Figure 9:
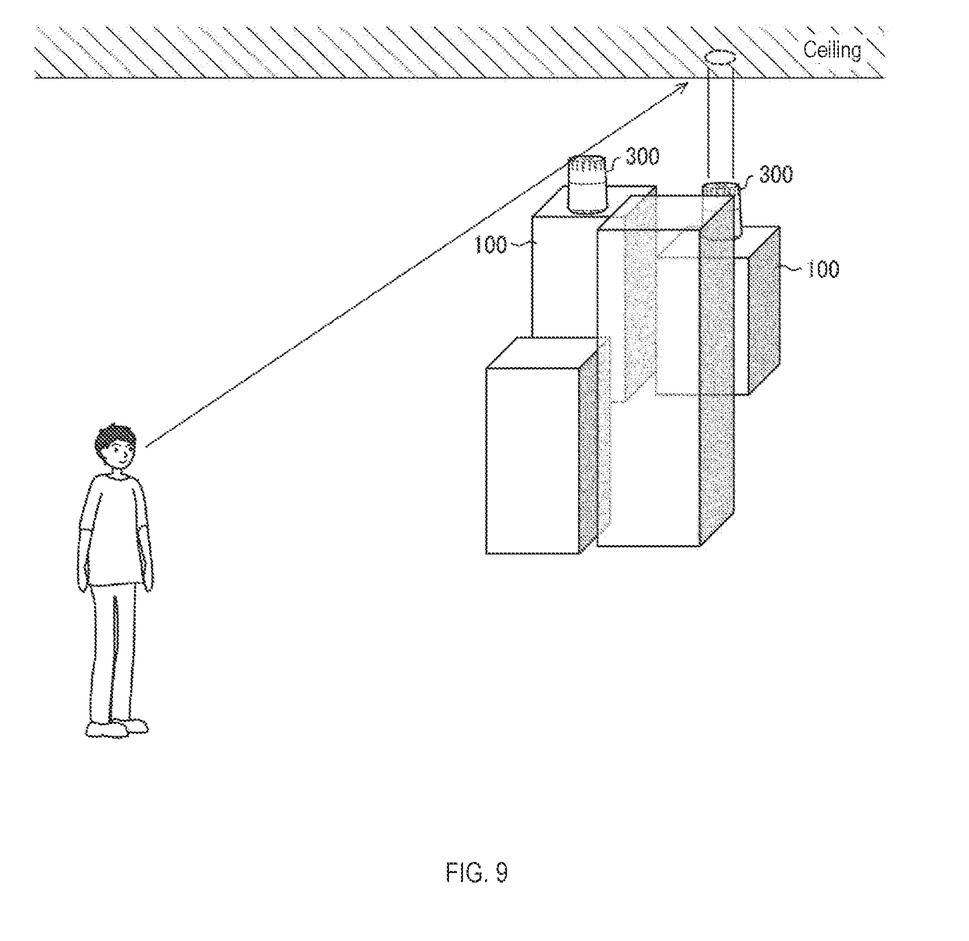
FIG. 9 is a schematic diagram showing a summary of comprehending an abnormality of a sample analyzer from a position where a user is separated by a sample analysis system.

The advantages of the sample analysis system 1 according to the embodiment of the present invention will be described with reference to FIG. 9. FIG. 9 is a schematic diagram showing an outline of how the sample analysis system 1 comprehends the abnormality of the sample analyzer 100 from a position away from the user.

In the example of the drawing, a plurality of sample analyzers 100 are installed in a room with a ceiling together with the corresponding notification device 300, and the user is located away from each sample analyzer 100. In the sample analysis system 1 according to the present invention, the light emitting operation of the notification device 300 is controlled according to the status of the sample analyzer 100. For example, when the sample analyzer 100 is operating normally, the notification device 300 does not emit light upward but only emits light from the side. When an error that needs to be dealt with occurs in the sample analyzer 100, light is irradiated upward to illuminate a certain area of the ceiling. In this way the user can readily comprehend that an error requiring remedy has occurred in the sample analyzer 100 connected to the notification device 300 that is installed below the position where the light hits when looking at the ceiling. Then, by moving toward the light, it is possible to move to the vicinity of the sample analyzer 100 in which an error that needs to be handled has occurred.

What is claimed is:

1. A sample analysis system comprising:
   a sample analyzer configured to analyze a sample;
   a notification device comprising a housing having an upper surface and an irradiating unit mounted to the sample analyzer; and
   a control unit configured to control irradiation of light from the irradiating unit;

the irradiating unit comprises a light source and is configured to irradiate a signal light from the irradiating unit in a vertical direction toward a ceiling in a room in which the sample analysis system is located, wherein the ceiling is above the sample analyzer such that the signal light may be seen on the ceiling by a user;

wherein the upper surface of the housing of the notification device has an irradiation window for allowing the signal light to pass through the irradiation window to the ceiling;

wherein the notification device includes a lens arranged within the irradiating unit, the lens configured so as to direct the irradiated light in the vertical direction toward the ceiling to condense the irradiated light from the irradiating unit so as to become parallel;

wherein the notification device includes a light emitting unit configured to emit light laterally; and wherein the control unit is configured to control the light emitting unit to emit the light laterally in response to a status of the sample analyzer.

2. The sample analysis system according to claim 1, wherein
the housing further comprises a color filter configured to change a color of the light irradiated through the irradiation window in an exchangeable manner.

3. The sample analysis system according to claim 1, wherein
the control unit is configured to control the irradiating unit to stop the irradiation of light in response to a change of the status of the sample analyzer.

4. The sample analysis system according to claim 1, wherein
the control unit is configured to control the irradiating unit to irradiate the light upward in response to determining that the sample analyzer is in a predetermined status.

5. The sample analysis system according to claim 4, wherein
the sample analyzer further comprises a reagent storage and a sensor configured to detect a residual amount of a reagent in the reagent storage used for analyzing the sample; and
the predetermined status includes status where the residual amount of the reagent detected by the sensor is equal to or less than a predetermined amount.

6. The sample analysis system according to claim 1, wherein
the control unit is configured to control the irradiating unit to stop the irradiation of light and control the light emitting unit to emit the light in response to predetermining different status of the sample analyzer.

7. The sample analysis system according to claim 1, wherein
the control unit is configured to control the light emitting unit to change a color of light in response to predetermining the status of the sample analyzer.

8. The sample analysis system according to claim 1, further comprising:
an information processing device configured to generate a control signal in response to the status of the sample analyzer;
wherein the control unit is configured to receive the control signal generated by the information processing device, and control the irradiating unit and the light emitting unit in response to the received control signal.

9. The sample analysis system according to claim 1, wherein
the control unit is configured to change a combination of a color of the light irradiated by the irradiating unit and a color of the light emitted by the light emitting unit in response to the status of the sample analyzer.

10. The sample analysis system according to claim 1, wherein
the notification device is configured to be installed separately from the sample analyzer.

11. The sample analysis system according to claim 1, wherein
the irradiating unit comprises a cylindrical reflector in which an optical system is disposed and the cylindrical reflector is configured to guide the light from the optical system to the irradiation window.

12. The sample analysis system according to claim 1, wherein the irradiating unit includes a cylindrical reflector that is configured to guide the light from the irradiating unit upwardly.

13. The sample analysis system according to claim 1, further comprising:
a memory configured to store an error list including a plurality of types of errors and a plurality of types of light emission patterns associated with each other, the light emission pattern being combination of a vertical light emission from the irradiating unit and a lateral light emission from the light emitting unit, and wherein
the controller is configured to control the irradiating unit and the light emitting unit according to one of the light emission patterns associated with one of the errors in response to detecting the one of the errors.

14. The sample analysis system according to claim 13, wherein
the vertical light emission in the error list is selectable between light irradiation and non-irradiation.

* * * * *